Patented Aug. 5, 1952

2,605,507

UNITED STATES PATENT OFFICE 2,605,507

PROCESS FOR SPINNING SOLUTIONS OF RUBBER

Leendert Maaskant, Arnhem, Netherlands, assignor to N. V. Onderzoekingsinstituut Research, Arnhem, Netherlands, a corporation of the Netherlands No Drawing. Application January 3, 1951, Serial No. 204,269. In the Netherlands January 11, 1950

7 Claims. (Cl. 18—54)

This invention relates to the manufacture of artificial threads, fibers, ribbons, foils and the like having good textile properties from solutions of rubber by forcing them through spinnerets into suitable spinning baths.

One of the principal objects of the present invention is to provide a new and improved method for producing the artificial threads, fibers, ribbons, films, foils, etc., from rubber, especially natural rubber. A further object of the invention is to provide a method for adjusting the conditions under which the solutions of rubber are spun in such manner as to produce artificial threads and other spun products having good textile properties and containing optimum quantities of sulphur, namely sulphur in the range of from 17% to 20%.

The manner in which these and other objects and features of the invention are attained will appear more fully from the following description thereof, in which reference is made to typical and preferred procedures in order to indicate more fully the nature of the invention but without intending to limit the invention thereby.

It is already known that solutions of high molecular weight, chainlike, multiple-unsaturated compounds of natural or synthetic origin, such as rubber and polybutadiene, can be spun through spinnerets into spinning baths, such as for example aqueous alcohol in which sulfur dioxide is dissolved, to form threads, fibers, ribbons, etc., the spinning solution having added thereto a suitable spinning activator, for example tetralin hydroperoxide, in order to accelerate the reaction between the rubber and sulfur dioxide.

As described in my co-pending U. S. application Serial No. 163,788, filed May 23, 1950, now abandoned, the freshly spun threads, fibers, etc., may be stretched while hot immediately after the spinning in continuous operation, as a result of which the dry and wet strengths of the resulting spun products are improved very appreciably.

It has been found that, in general, ordinary commercial rubber cannot satisfactorily be employed as such; instead, the rubber must first be suitably plasticized. For example, as described in my co-pending U. S. application, Serial No. 161,027, filed May 9, 1950, now abandoned, in order to produce the desired concentrated rubber solutions preparatory to spinning, the rubber must first be plasticized substantially more than is customary in the rubber industry. In fact, as is shown in that application, it is generally advantageous to continue the plasticizing treatment to a still further extent, particularly when rubber solutions of relatively higher concentrations in respect of their rubber content are to be spun.

In ascertaining and expressing the degree of plasticity of the rubber, this may conveniently be expressed in terms of the so-called "standard viscosity" by the method more particularly described in my aforesaid U. S. application Serial No. 161,027, which is therefore incorporated herein by reference. Briefly, the method involves subdividing the rubber into small pieces which are then dissolved in toluene to form a solution having a rubber hydrocarbon concentration of 6.5% by weight. The viscosity of the resulting solution, measured at 25° C., is then determined by means of an Ubbelohde viscosimeter and expressed in poises. This test method gives reproducible results, and therefore forms a convenient and accurate measure of the degree of plasticization of the rubber.

As described in my aforesaid co-pending U. S. application Serial No. 161,027, when a rubber solution of at least 10% by weight of rubber hydrocarbons is employed for spinning purposes, the rubber must be plasticized to such an extent before it is made up into the spinning solution that it has a standard viscosity of less than 5 poises.

It has been found that the spun products manufactured as described above sometimes show a certain degree of instability in that the rubber-sulfur dioxide reaction product tends to decompose to a certain extent when it is heated in the air for a rather long time or when it is subjected to the influence of strong actinic light, appreciable quantities of sulfur dioxide being given off.

It was found possible to overcome this disadvantage for the most part by employing a suitable stabilization treatment, for example aqueous thiourea solutions. Thus, according to my co-pending U. S. application Serial No. 166,545, filed June 6, 1950, now abandoned, it is even possible to accomplish the desired stabilization immediately after the continuous spinning step and after or during the stretching operation.

The foregoing procedures for manufacturing new artificial spun products appeared to have the very substantial technical advantage of making it possible to produce spun products under the most diverse process conditions, such as type and manner of preparation of the spinning solution, type and composition of the spinning bath, temperature of spinning, etc. However, the products thus obtained sometimes show rather different properties, and on further investigation they appeared in some instances to offer certain disadvantages for use in textile purposes. Thus, they are sometimes either too brittle or too rubberlike, or their resistance to wear or other properties relating to their use under practical conditions are not always as good as desired.

The apparent initial advantage of the almost unlimited spinning possibilities offered by these prior processes thus finally turned out, in some instances, to possess the disadvantage that they made it difficult to gain any real insight into and understanding of which factors were determinative in obtaining textile fibers or threads having the maximum serviceability.

Formerly, those skilled in the art were of the opinion that one factor had been found that was of fundamental importance to the spinning operation, viz. the practically complete conversion into that rubber-sulfur dioxide reaction product having the highest possible sulfur content, i. e., about 23%. This opinion seemed to be supported experimentally by the fact that initially it was difficult to stabilize the spun products having a lower sulfur content. As a result, there was a tendency on the part of those skilled in the art to manufacture a spun product having the highest possible sulfur content, viz. a final product having about 23% sulfur when using rubber and, when using polybutadiene, a final product having about 22% sulfur.

The spun products manufactured in this way showed relatively good strengths, particularly when they were stretched immediately after the spinning step in continuous operation, and if desired, also in combination with continuous stabilization.

Unfortunately, even these spun products were found to sometimes display a peculiar brittleness. Under the microscope the cross-sections of the fibers, particularly when they were cut with a microtome, showed cracks at the periphery. Owing to this disadvantage the threads are relatively difficult to process, while articles manufactured from them may tend to show a substantial degree of wear. Accordingly, it was found that the measured resistance to wear of the threads manufactured in this manner frequently left much to be desired.

In accordance with the present invention, however, my further research and study of the problems involved in the manufacture of spun products of the kind mentioned hereinbefore have led me to the surprising and unexpected discovery that artificial threads and other products having good textile properties can be spun from rubber solutions by employing a rubber which has been plasticized to an extent that it possesses a standard viscosity lower than 3 poises and from which rubber a spinning solution is prepared which contains at least 10% by weight of the rubber; and provided further that the rubber solution so prepared is then spun in a spinning bath containing sulfur dioxide and a spinning activator, the quantities of each of which as well as the temperature of the spinning bath being so chosen that a thread or other spun product is produced which contains at least 17% and at most 20% of sulfur.

It was by no means obvious to purposely effect a less complete reaction between the rubber and the sulfur dioxide, because products having a lower sulfur content which were known to the prior art, for example as manufactured according to the procedure described in Dutch Patent No. 59,323, and which contain about 11% sulfur, are still too rubber-like and too sticky during the subsequent processing as well as in use and for these reasons were found to be undesirable and unserviceable for general textile purposes.

In practicing the process according to the present invention, heed should be given to the following considerations: The sulfur absorption increases with increasing quantity of the spinning-activator, calculated on the polymer, to a certain saturation limit, which for rubber lies at a sulfur content of about 23%. The sulfur absorption also increases with increasing sulfur dioxide content of the spinning bath. The sulfur absorption generally decreases with increasing spinning bath temperature.

However, in the case of rubber the maximum sulfur absorption does not exceed about 23%, irrespectively of how the quantity of activator and/or the sulfur dioxide concentration in the spinning bath may be increased and/or how the spinning bath temperature may be decreased.

I have discovered that by suitably varying these three spinning factors within the ranges to be set forth hereinafter, the sulfur absorption by the threads or other spun products can be adjusted to the desired value, viz. between 17% and 20%.

In order to indicate still more fully the nature of the present invention, the following examples of typical procedures are set forth, it being understood that this description is included by way of illustration only, and not as limiting the scope of the invention.

In the procedure of each of these examples, rubber was employed that had been plasticized to such an extent that its standard viscosity was 1 poise. This plasticized rubber was then dissolved in toluene to give a spinning solution containing 12% rubber by weight. The spinning bath consisted of 80% by volume of ethyl alcohol and 20% by volume of water, to which quantities of sulfur dioxide had been added in the amounts indicated hereinafter.

*Example Ia*

The spinning bath contained 180 grams per liter of sulfur dioxide, while the temperature was maintained at −5° C. With a spinning-activator content of 3.1% of tetralin hydroperoxide, calculated on the rubber, a thread with 17% of sulfur was obtained.

*Example Ib*

The conditions were otherwise identical to those described above in Example Ia except that 5.6% of tetralin hydroperoxide, calculated on the rubber, was present in the spinning solution. A thread having a sulfur content of 20% was thus obtained.

Under otherwise identical conditions of sulfur dioxide concentration and spinning bath temperature, when quantities of tetralin hydroperoxide varying from 3.1% to 5.6%, calculated on the rubber, are added to the spinning solution, threads are obtained having sulfur contents varying from 17% to 20%.

*Example IIa*

Here the quantity of tetralin hydroperoxide present in the spinning solution amounted to 5%, calculated on the rubber, and the spinning temperature was maintained at −5° C. When the spinning bath contained 105 grams per liter of sulfur dioxide, the thread thus obtained contained 17% of sulfur.

Example IIb

Under otherwise identical conditions to those described above in Example IIa, but with a spinning bath containing 190 grams per liter of sulfur dioxide, the resulting thread contained 20% of sulfur.

By varying the sulfur dioxide concentration in the spinning bath from 105 to 190 grams per liter, the remaining spinning conditions being the same, threads with a sulfur content varying from 17% to 20% are obtained.

Example IIIa

The quantity of tetralin hydroperoxide present in the spinning solution amounted to 5%, calculated on the rubber, and the sulfur dioxide concentration in the spinning bath was maintained at 180 grams per liter. At a spinning bath temperature of 3° C., the thread obtained contained 17% of sulfur.

Example IIIb

Under otherwise identical conditions as described above in Example IIIa, but with a spinning bath temperature of —8° C., the thread contained 20% of sulfur.

At spinning bath temperatures varying between 3° C. and —8° C., other conditions remaining the same as above, threads are obtained which contain from 17% to 20% of sulfur.

I have discovered that in general when employing the same good types of rubber and the spinning conditions mentioned above (i. e., as regards the content of spinning activator in the spinning solution, the sulfur dioxide concentration in the spinning bath, and the temperature of the spinning bath) threads or other spun products having substantially the same sulfur content are always obtained. Of course, it will be appreciated by those skilled in the art that in order to obtain a predetermined sulfur content in the threads or other spun products it may sometimes become necessary to make small modifications in the spinning conditions when changing over from one type of rubber to another or when changing over to rubber having slightly different "standard viscosities." These slight changes in spinning conditions, when found to be necessary, may be readily ascertained by those skilled in the art with the aid of the description set forth above.

Within the indicated limits of the sulfur content, i. e., from 17% to 20%, the indicated concentrations of rubber in the spinning solution and the standard viscosity of the rubber employed in making up the spinning solution, the resulting threads show unexpectedly good textile properties, particularly as regards their resistance to wear, their dyeing affinity and their strength in the wet state, the latter differing only very little from that in the dry state.

I have found that the improvement in properties of the spun products is particularly outstanding if the concentration of the rubber solution employed for spinning is adjusted to at least 12% by weight of rubber, or even higher. As described in my aforesaid co-pending U. S. application Serial No. 161,027, in the case of spinning solutions having a concentration of 12% by weight of rubber it is advisable to employ rubber that has been plasticized to a standard viscosity of less than 3 poises. Preferably, under such conditions the standard viscosity of the rubber employed should be about 1 poise. At still higher concentrations of rubber in the spinning solution it is still more preferable to use rubber which has been plasticized still further so that its standard viscosity is even appreciably lower than 1 poise.

According to the present process, wear values can be obtained which are equal to those of good, commercially obtainable artificial threads made with viscose. In addition to having good dry strength properties, according to the new process a wet strength can be obtained which is practically equal to the dry strength.

In general, the spun products formed by reaction of rubber with sulfur dioxide can be easily dyed with dyestuffs which are used for dyeing artificial threads made from cellulose esters, such as for example cellulose acetate. The threads, fibers, ribbons, etc. manufactured according to the present invention possess the definite advantage that the dyeing with these dyestuffs is more intensive than that of spun products containing more than 20% of sulfur. In some cases the dyeing of the spun products manufactured according to the present invention is even more intensive than that of spun products made from cellulose acetate.

Moreover, the manufacture on an industrial scale of the spun products according to the present invention takes place under most favorable conditions, because the initial draw-off speed of the thread, the stretching speed and the winding speed, all of which are very important factors in relation to the production capacity of a given machine, can be increased to values not hitherto known. For example, for threads having a single filament denier of 3 or 2, or even of 1, winding speeds of 100, 150 and 200 meters per minute and higher can be employed.

On the other hand, when manufacturing threads which contain more than 20% of sulfur, the initial draw-off speed of the thread, the stretching speed and also the winding speed must be adjusted to a relatively low value. When manufacturing artificial threads such as these having a filament denier of from 1 to 3, winding speeds of 100 meters per minute can rarely be employed. In contrast thereto, according to the present invention winding speeds far higher than 100 meters per minute can readily be achieved with an intermediate stretching of 250%, 300%, 350%, or even more.

It must be borne in mind that threads having a sulfur content of more than 20%, and particularly threads with about the maximum sulfur content of approximately 23%, are very brittle and show relatively low resistance to wear, whereas threads having less than 17% of sulfur are very sticky, so that both types of threads are unserviceable for use in the textile industry because of their undesirable mechanical properties.

While tetralin hydroperoxide is well adapted for use in carrying out the process in accordance with the present invention, other substantially equally acting spinning activators may also be used, for example triphenylmethyl hydroperoxide, tertiary butyl hydroperoxide, and the like.

When employing spinning-activators which are relatively less effective than tetralin hydroperoxide (weight for weight) larger quantities must be added to the spinning solution, while in the case of activators more effective than tetralin hydroperoxide (weight for weight) correspondingly smaller quantities should be added.

While specific examples of preferred methods embodying the present invention have been de-

What is claimed is:

1. In a process for manufacturing artificial spun products having good textile properties from solutions of rubber that has been plasticized to a standard viscosity below 3 poises, said rubber being dissolved in an organic solvent to make up a spinning solution containing at least 10% by weight of the rubber, said solution containing a spinning-activator and being spun at temperatures below room temperature into a sulfur dioxide-containing spinning bath, the improvement comprising (a) adjusting the spinning-activator in the spinning solution to a concentration of from 3.1% to 5.6%, calculated on the rubber, (b) adjusting the sulfur dioxide in the spinning bath to a concentration of from 105 to 190 grams per liter, and (c) maintaining the spinning bath at a temperature between 3° C. and −8° C. during the spinning operation, thereby producing an artificial spun product containing at least 17% and at most 20% of sulfur.

2. A process as in claim 1 wherein the spinning solution contains a spinning-activator selected from the class consisting of tetralin hydroperoxide, triphenylmethyl hydroperoxide, and tertiary butyl hydroperoxide.

3. In a process for manufacturing artificial spun products having good textile properties from solutions of rubber that has been plasticized to a standard viscosity of at most about 1 poise, said rubber being dissolved in an organic solvent to make up a spinning solution containing at least 12% by weight of rubber, said solution containing a spinning-activator and being spun at temperatures below room temperature into a sulfur dioxide-containing spinning bath, the improvement comprising (a) adjusting the spinning-activator in the spinning solution to a concentration of from 3.1% to 5.6%, calculated on the rubber, (b) adjusting the sulfur dioxide in the spinning bath to a concentration of from 105 to 190 grams per liter, and (c) maintaining the spinning bath at a temperature between 3° C. and −8° C. during the spinning operation, thereby producing an artificial spun product containing at least 17% and at most 20% of sulfur.

4. A process as in claim 3 wherein the spinning solution contains a spinning-activator selected from the class consisting of tetralin hydroperoxide, triphenylmethyl hydroperoxide, and tertiary butyl hydroperoxide.

5. A process as in claim 3 wherein the spinning bath is maintained at −5° C. and contains 180 grams per liter of sulfur dioxide, and wherein from 3.1% to 5.6% of tetralin hydroperoxide, calculated on the rubber, is used as spinning-activator in the spinning solution.

6. A process as in claim 3 wherein the spinning solution contains 5% of tetralin hydroperoxide, calculated on the rubber, as spinning-activator, and the spinning bath is maintained at a temperature of −5° C.

7. A process as in claim 3 wherein the spinning solution contains 5% of tetralin hydroperoxide, calculated on the rubber, as spinning-activator, and the spinning bath contains 180 grains per liter of sulfur dioxide.

LEENDERT MAASKANT.

REFERENCES CITED

The following references are of record in the file of this patent:

UNITED STATES PATENTS

| Number | Name | Date |
|---|---|---|
| 2,469,847 | Rumscheidt | May 10, 1949 |
| 2,265,722 | DeNie | Dec. 9, 1951 |